3,510,330
METHOD FOR PROCESSING CLAY AND
PRODUCT THEREOF
Gerhardt Talvenheimo, Basking Ridge, and Robert J. Bergmann, Irvington, N.J., assignors, by mesne assignments, to Engelhard Minerals & Chemicals Corporation, Edison, N.J., a corporation of Delaware
No Drawing. Filed June 9, 1967, Ser. No. 644,778
Int. Cl. C07c 1/42; C08h 17/06
U.S. Cl. 106—288                                10 Claims

ABSTRACT OF THE DISCLOSURE

The high shear aqueous viscosity of kaolin clay is reduced by pugging the clay intensively in an aqueous solution of urea, preferably in a dilute (e.g., 5% to 10%) solution and without forming a kaolinite-urea intercalation compound. The urea is washed from the pugged clay.

BACKGROUND OF THE INVENTION

A vast quantity of kaolin clay is used as a coating pigment by the paper industry. The clay provides a desirable smooth white finish on the paper. One of the most important criterion used in selecting clay products for paper coating use is the aqueous viscosity of the clay, especially the high shear aqueous viscosity of a concentrated aqueous slip of the clay. Kaolin coating pigments are therefore usually supplied with high shear viscosity specifications. The "low viscosity" or "LV" clays typically have apparent viscosities (Hercules end point) less than about 14 dyns-cm.$\times 10^5$ at a rate of shear of 1100 r.p.m. for dispersed aqueous slips of about 71% clay solids. "Medium viscosity" or "MV" clays have viscosities in excess of about 14 dyne-cm. at 1100 r.p.m. and may go to 500 r.p.m. at 17 dyne-cm.$\times 10^5$. A clay is generally considered to be a "high viscosity" or "HV" clay when its apparent viscosity is 17 dyne-cm.$\times 10^5$ at a rate of shear less than 500 r.p.m.

Low viscosity clays are strongly preferred in most paper coating applications, especially modern coating plants, and medium viscosity clay is preferable to high viscosity clay.

Only a limited number of clay crudes or fractionated clay crudes have a sufficiently low apparent high shear viscosity for use by modern paper coating plants. Of these clays, very few are in the low viscosity class. Therefore, kaolin clays intended for high solids paper coating use are usually specially processed in order to reduce their aqueous viscosity. This treatment has generally involved working the clay with a high energy input, either by pugging a solid or semisolid mass with or without a dispersant, or by working a fluid slip of the clay with an agitator in a mill such as for example a Morehouse mill.

The results have varied to a great extent with the nature of the clay being treated. Rarely, however, has the work treatment been sufficiently effective to reduce a "HV" clay to a "LV" clay such as a 2 dyne clay (clay having an apparent Hercules end point viscosity less than 2 dyne-cm.$\times 10^5$ at a rate of shear of 1100 r.p.m. for dispersed 70% to 71% solids slip).

THE INVENTION

Accordingly, an object of this invention is to provide an outstandingly effective method for reducing the high shear aqueous viscosity of kaolin clay.

Another object is to reduce clay viscosity by mechanically working the clay in the presence of an inexpensive chemical additive.

Another object is to reduce the apparent high shear viscosity of kaolin clay without apparently chemically altering the clay.

A correlative object is to provide a novel kaolin clay product.

Briefly stated, in accordance with this invention the high shear aqueous viscosity of kaolin clay is reduced by pugging (viscous kneading) the clay in an aqueous solution of urea (carbamide). A dilute solution of urea is preferably employed. The urea, upon completion of kneading, is immediately removed from the clay by washing and the clay is subsequently prepared as a dispersed slip for coating color use.

THE PRIOR ART

We are aware that it has been suggested to reduce the low shear (Brookfield) viscosity of kaolin clays by treating the clay with a guanidine salt (guanidine is an isolog of urea). The process, described in U.S. 2,994,616 to Rowland, entails the addition of a small amount of the guanidine salt to a fluid slip of nondilatant clay without working the clay. The salt is retained in the clay since the presence of the additive is essential to the realization of the reduced viscosity in the prior art process. Our process, in contrast, necessitates a working step and the urea additive must be washed from the clay before the clay is employed for its intended use. Thus, the process of the prior art entails a chemical modification of clay to improve low shear viscosity, whereas the present invention contemplates physico-chemical processing of clay without changing the composition of the clay in order to improve high shear viscosity.

We are also aware that it has been suggested to produce a kaolinite-urea intercalation compound (U.S. 3,309,211 to Weiss et al.). As shown in the patent, saturated urea solutions are employed and extensive contact times are required unless the reaction is carried out at elevated temperature in closed vessels. Our process, in contrast, gives best results when the formation of a kaolinite-urea intercalation compound is avoided. Further, the results that are realized in our process are improved markedly by using dilute urea solutions at room temperature rather than the saturated solutions employed to produce the urea-kaolinite compound of the prior art.

The following patents deal with viscosity reduction of kaolin clay by viscous kneading of the clay.

U.S. 2,535,647—Millman et al.
U.S. 2,907,666—Millman et al.
U.S. 3,301,691—Hemstock et al.

DESCRIPTION OF THE INVENTION

The invention is applicable to improving the viscosity of any kaolin clay product irrespective of particle size and/or particle size distribution. Thus the process can be used with fine and coarse size fractions of kaolin clay. The process is especially effective with kaolins containing particles composed of thin stacks of kaolin platelets. Most kaolin crudes contain particles composed of stacks or booklets of kaolin platelets. The process is also effective with mechanically delaminated clays, a type of processed clay which responds very poorly to conventional viscosity reduction methods. Mechanically delaminated clay and a method for its preparation is described in U.S. 3,171,718 to Gunn et al.

Preferably the clays are processed at least to the extent that coarse grit is removed. This is desirable in order to minimize wear on the pug mill. Dispersed clays (i.e., clays containing added deflocculating agents) or nondispersed clays can be used.

During the pugging operation it is desirable to maintain the urea concentration well below the saturation level, preferably maintaining it within the range of about ¼ to 20%, especially 1% to 10% by weight. All concentrations mentioned herein are reported as the weight percent urea based on the total weight of the solution. (A saturated aqueous urea solution contains 78 gm./100 gm. solution at 41° F.)

The use of about ¼ to 15 gm. urea per 100 gm. dry clay is suggested. Especially good results have been realized with 1 to 10 gm. urea per 100 gm. dry clay.

During the pugging step the clay solids are usually maintained within the range of about 65% to about 80% (i.e., 65 to 80 parts bone dry clay to 35 to 20 parts by weight water). This may necessitate addition of water or urea solution when an open pug mill is used.

Various procedures can be employed in carrying out the viscous kneading or pugging step. For example, dry urea can be blended with clay and water or urea solution then added. When this procedure is followed and the pugging is in an open mill, water and/or urea solution are normally added during the pugging operation to maintain the clay in a puggable state or condition. Another procedure is to add all of the urea as a solution, gradually adding either water or more solution of the same or different urea concentration to maintain the clay in a puggable conditon. Another procedure is to add all of the urea as a solution, gradually adding either more solutioin or water. As another possibility, the clay can be pugged with water and, while the pugger is in operation, solid urea or a urea solution is added.

The working step can be carried out in any agitating equipment capable of kneading the moist clay mix. Pug mills of the worm or screw type, such as are employed by the clay industry, can be used, as can pug mills, which are provided with sigma blades. The mixing equipment can be batch type or continuous and it can be opened or closed. Suitable mills operate on the clay in a manner such as to shear moist clay particles, one over the other, by a kneading action (as opposed to a shattering or grinding action). Energy inputs within the range of about 15 to 200 H.P./ton are suggested.

Immediately after pugging, the urea should be removed from the clay. This can be accomplished satisfactorily by washing the pugged clay with water. The urea should be removed before the clay is dried in order to avoid reaction between the clay and the urea to form an intercalation compound. After the clay has been washed, it can be prepared into a slip employing the usual deflocculating agents such as, for example, sodium hexametaphosphate or tetrasodium pyrophosphate (TSPP). For coating color use, these slips normally contain at least 65% solids. The deflocculated slips may be spray dried to provide predispersed clay products. If desired, the clay may be dried and pulverized after washing.

EXAMPLES OF THE INVENTION

In the illustrative examples which follow, all viscous kneading (pugging) was carried out in an open pug mill. The mill was a 1600 cc. capacity sigma-blade Read mixer.

In all runs, the pug mill was charged with 600 gm. of dry clay and 250 cc. liquid (water or urea solution). These slips initially contained 70.6% clay solids. During most of the runs, the temperature rose, causing water to evaporate. To compensate for the loss of water and to maintain the charge in the Read mixer in puggable consistency, water or urea solution was periodically added when required. Total pugging time was six hours unless otherwise indicated.

In all cases in which urea had been added to the liquid in the pug mill, the pugged clay was washed on a Buchner funnel with distilled water to a minimum specific resistance of 8,000 to 10,000 ohm-cm. before the pugged clay was dried at 110° C. and pulverized.

All high shear viscosity data refer to values obtained with a Hercules Hi-Shear viscometer.

The Hercules viscometer is a rotational instrument which automatically traces a continuous plot of torque versus rate of shear over a rate of shear range of 0 to 4540 reciprocal seconds. The instrument is described in an article by J. W. Smith and P. D. Applegate, "The Hercules Hi-Shear Viscometer," Paper Trade Journal 126, No. 23, 60–66 (June 3, 1948). Since apparent viscosity is inversely proportional to rate of shear at a given shearing force (torque), a fluid of highest apparent viscosity is indicated by a rate of shear-stress curve with maximum shearing force at a maximum rate of shear.

In order to keep the degree of deflocculation and clay solids content at values approximating those employed in making down clay for paper coating use, the dry clay was agitated for one minute in a Waring Blendor with distilled water and dispersant ($Na_4P_2O_7$) in the amount indicated. The quantity of dispersant employed was sufficient to produce a slip of minimum Hercules viscosity at the solids used.

All clay particle sizes referred to herein represent the size of the ultimate clay particles and are reported as equivalent spherical diameters (E.S.D.) in microns. Particle size was determined by sedimentation procedure described in TAPPI Standards, T649 sm–54; particle size in ranges below 0.5 micron was determined by a simple modification of the TAPPI method which provided for the use of a long arm centrifuge, as described in a publication by F. H. Norton and S. Speil in J. Am. Ceramic Soc., 21:89 (1938).

EXAMPLE I

Processing a "HV" fine size fraction kaolin clay

Tests were carried out with a fine size fraction "HV" clay which was reported to be very unresponsive to conventional viscosity reduction processes (i.e., viscous kneading and intensive high shear agitation of a fluid slip of the clay.) Thus a 71% solids slip of the clay had a viscosity in excess of 17.0 dyne-cm.$\times 10^5$ at a rate of shear of 810 r.p.m. when intensively pugged with water alone, in accordance with the prior art. After being intensively pugged with urea solutions of about 5% to 10% concentration and washed, the clay was converted to "LV" clay having a viscosity of about 2 dyne-cm.$\times 10^5$ at 1100 r.p.m. So drastic was the viscosity reduction that was realized that the urea-treated clays could be formulated into 74% solids slips which were much less viscous than a 71% solids slip of the starting clay. It is well known in the art that most kaolins cannot be formed into 74% solids slips which are still fluid at high shear rates. Most kaolin clays tend to become increasingly dilatant as solids are increased and 74% solids slips are frequently semisolid at high rates of shear.

The results above-described were obtained using dilute (5–10%) urea solutions. As mentioned, "LV" products having about 2 dyne viscosity were obtained from the original "HV" clay. However, when a urea solution closer to saturation concentration was employed, a "MV" clay having about 7 dyne viscosity was obtained rather than the 2 dyne clay obtained with the more dilute urea solution.

These results are summarized in Table I.

TABLE I.—VISCOSITY REDUCTION OF "HV" CLAY BY PLUGGING WITH UREA

| Pugging Liquid | Wt. percent solids of clay slip | Wt. percent TSPP* in slip | pH of slip | Torque, dyne-cm. ×10⁵ | Bob speed, r.p.m. |
|---|---|---|---|---|---|
| None (no pugging) | 71.2 | 0.3 | 5.9 | 17.0 | 125 |
| Water (prior art, 5 hrs., pugging) | 71.2 | 0.5 | 6.2 | 17.0 | 810 |
| Urea solution (5% conc.) | 71.1 | 0.5 | 6.9 | 2.3 | 1,100 |
| Urea solution (10% conc.) | 70.9 | 0.5 | 6.6 | 1.9 | 1,100 |
| Urea solution (38% conc.) | 70.9 | 0.3 | 8.6 | 7.5 | 1,100 |
| Urea solution (5% conc.) | 74.0 | 0.4 | | 17.0 | 345 |
| Urea solution (10% conc.) | 74.0 | 0.4 | | 17.0 | 460 |
| Urea solution (38% conc.) | 74.0 | 0.3 | | 17.0 | 190 |

*Tetrasodium pyrophosphate dispersant.

Details of the tests with "HV" clay are as follows.

The starting clay in Example I was an "HT" fraction of sedimentary "soft" Georgia kaolin from a mine near McIntyre, Ga. The clay was obtained by blunging the crude in water, degritting the clay to substantially minus 325 mesh using a wet degritting system, hydroclassifying the minus 325 mesh slip in centrifugal sizers, recovering a product ("HT") calculated to contain 78% to 82% by weight of particles finer than 2 microns, E.S.D., bleaching the "HT" clay with zinc hydrosulfite, thickening with sulfuric acid, filtering and washing. The clay was then dried.

In carrying out the pugging test with the 5% urea solution, the solution was prepared by employing 5 gm. urea (anhydrous) per 95 gm. distilled water.

A 600 gm. charge of clay was added to the Read mill and 250 ml. of the 5% urea solution was added. After pugging for ½ hour, the temperature had increased from 81° F. to 104° F. While the pugger was operating, additional urea solution was gradually added in amount of of about 30 ml. per ½ hour. Maximum temperature was 120° F. and total pugging time was six hours. Total urea solution employed was 632 ml., corresponding to the use of 5.27% anhydrous urea, based on the dry clay weight.

The pugged clay was found to have a moisture content of 32.2%. An X-ray diffraction of a sample indicated that a kaolinite-urea intercalation compound was not formed since the pattern indicated that the kaolinite had not been expanded along its c-axis.

The pugged clay (except for a 20 gm. sample removed for the X-ray analysis) was discharged from the pug mill and was suspended in 1000 ml. deionized water. The suspension was filtered and washed with deionized water until the filtrate had a minimum specific resistance of 8,000 to 10,000 ohm.-cm. The material was dried at 110° C. for about 48 hours.

In pugging with 10% urea solution, 250 ml. of the 10% solution was added to 600 gm. of clay in the open pug mill and additional 10% urea solution was gradually added over a period of six hours until a total of 706 ml. had been added, corresponding to the use of 11.8% urea, based on the clay weight. Temperature reached 120° F. after three hours of pugging and increased to a maximum of 126° F. after five hours of pugging. A sample of this clay was analyzed and the remainder washed and dried under conditions similar to those employed with the 5% urea solution.

In the test in which the urea solution was prepared by mixing 180 gm. urea in 300 ml. water, the solution was added over a period of about 20 minutes to a 600 gm. charge of the "HT" clay while the mill was running. After the mill had been running almost two hours, water was added in amount of about 10 ml. every ten minutes until a total of 162 ml. of water had been added. The temperature of the charge in the pug mill increased from 79° F. to 125° F. after four hours and reached 140° F. at the end of the pugging. The moisture content of the pugged clay was found to be 22.5%.

A sample of the clay was analyzed by X-ray diffraction and found to contain some kaolinite-urea intercalation compound. The remainder was washed and dried as described above.

EXAMPLE II

Processing "HV" coarse size fraction

The procedure of Example I was repeated with a coarse size fraction ("NoKarb") of kaolin clay obtained in a manner similar to that employed in producing the "HT" with the exception that a coarse size fraction was recovered in the hydroclassifier. The clay, which contained about 50% by weight of particles larger than 2 microns (E.S.D.) and had an average size of about 5 microns (E.S.D.), contained a substantial amount of stacks or booklets of kaolinite platelets. Typical of most coarse size fractions of kaolins from the McIntyre district of Georgia, this coarse size fraction was a "HV" clay and could not be made down into a fluid 71% solids slip. In fact, at a bob speed of 1100 r.p.m. with the Hercules instrument, a dispersed slip of the "NoKarb" clay containing only 62.6% clay solids had a torque of 8.4 dyne-cm. ×10⁵.

The viscosity of the "NoKarb" clay was reduced to 17.0 dyne-cm.×10⁵ at 860 r.p.m. by pugging with water for six hours in the Read mill, as described above. The clay was pugged for twelve hours with a 10% solution of urea, gradually adding the solution to a 600 gm. charge of clay in the pug mill until a total of 414 ml. was added, corresponding to the use of 6.83% anhydrous urea based on the dry clay weight. This clay was washed and dried as in Example I. By this procedure, the viscosity of a 71.1% slip of the "NoKarb" kaolin clay was reduced to 12.4 dyne-dm.×10⁵ at a bob speed of 1100 r.p.m. In other words, by pugging with urea, the apparent viscosity of the clay was reduced so drastically that the apparent viscosity of a slip of the clay containing 71.7% solids was only slightly greater than the viscosity of a 62.6% slip of the same clay before it was pugged.

EXAMPLE III

Processing a "MV" clay (A) This example illustrates the application of the process of the invention to the viscosity-reduction of a representative medium viscosity commercial coating clay ("ASP 600"). This clay, which was a fine size fraction of a McIntyre crude, has a particle size smaller to that of the "HT" clay of Example I.

Unlike the "HT" fraction of Example I, this clay was very responsive to viscosity reduction by the conventional pugging technique. However, even with the conventional pugging, this clay was not converted into a 2 dyne clay product since it had a viscosity of 3.6 dyne-cm.×10⁵ at 1100 r.p.m. for a 71.2% solids slip.

The clay was pugged with a very dilute aqueous urea solution (0.5% weight concentration), using an initial charge of 250 ml. of solution and gradually adding more of the 0.5% solution in amount of about 20 to 30 ml. every 25 to 30 minutes until the total urea added corresponded to 0.48% of the dry clay weight. The pugged clay was washed and dried.

It was found that the viscosity of the urea-pugged clay was reduced well below the 2 dyne level (1.3 dyne-cm.×10⁵ at 1100 r.p.m.). In other words, the viscosity reduction was almost 300% more effective when the "MV" clay was pugged with dilute urea solution than when the clay was pugged under similar conditions with water. In fact, the viscosity reduction with the 0.5% urea solution was so remarkable that the clay could be prepared into a 74% solids slip having a viscosity of only 8.5 dyne-cm. at 1100 r.p.m. In contrast, when the clay was merely pugged in water, in accordance with the prior art, a 74% solids slip had a viscosity in excess of 17.0 dyne-cm.$\times 10^5$ at a bob speed of 920 r.p.m.

(B) In order to compare the effect of urea concentration on the effect of the pugging operation, a 10% urea solution was employed in lieu of the 0.5% urea of part (A) of this example. The "MV" clay was used.

The 10% solution was initially added in amount of 250 ml., as in Example I, followed by the gradual addition of more 10% urea solution during the six hour pugging operation. The total quantity of urea added to the clay was calculated to be 12.4%, based on the moisture-free clay weight.

The results were so outstanding in this case that a 74% solids slip of the urea-pugged clay almost met the 2 dyne specification and the clay could be made down into a 77.5% solids slip.

The results of the tests with the "MV" clay are summarized in Table II.

In accordance with this invention, a 600 gm. sample of the spray dried clay was charged to the Read mill and 250 ml. of urea solution (0.5% concentration) was added. An additional 160 ml. of the 0.5% urea solution was gradually added over a period of six hours to the charge in the pug mill while the pug mill was in operation. The total quantity of urea added corresponds to 0.26% of the dry clay weight.

For the first two hours of pugging, temperature of the charge was within the range of 80 to 87° F. For the remaining four hours, the charge was at a temperature within the range of about 87 to 95° F. The material was removed from the pug mill after six hours, mixed with 1000 ml. water, filtered, washed with distilled water to a conductivity of 2500 ohm-cm. and dried at 230° F. The aggregates of the dried clay were disintegrated in an Osterizer.

It was found that a 62.5% solids slip of the urea-pugged clay (0.5% tetrasodium pyrophosphate) had a viscosity of 2.1 dyne-cm.$\times 10^5$ at 1100 r.p.m. As mentioned, the original clay had a viscosity of 17.0 dyne-cm.$\times 10^5$ at only 225 r.p.m. for a slip of similar solids content. Since the starting clay had the viscosity charac-

TABLE II.—VISCOSITY REDUCTION OF "MV" CLAY BY PUGGING WITH UREA

| Pugging Liquid | Wt. percent solids of clay slip | Wt. percent TSPP* in slip | pH of slip | Torque, dyne-cm. $\times 10^5$ | Bob speed, r.p.m. |
|---|---|---|---|---|---|
| None (no pugging) | 70.7 | 0.4 | 6.6 | 17.0 | 600 |
| Water (prior art) | 71.2 | 0.4 | 6.6 | 3.6 | 1,100 |
|  | 74.1 | 0.5 | 6.7 | 17.0 | 920 |
| Urea solution (0.5% conc.) | 71.0 | 0.5 | 7.6 | 1.3 | 1,100 |
| Urea solution (0.5% conc.) | 74.0 | 0.4 | 7.6 | 8.5 | 1,100 |
| Urea solution (10% conc.) | 74.3 | 0.3 | 7.0 | 2.6 | 1,100 |
| Urea solution (10% conc.) | 77.5 | 0.4 | 7.0 | 17.0 | 200 |

*Tetrasodium pyrophosphate dispersant.

EXAMPLE IV

Since some viscosity reduction methods are accomplished while undesirably increasing the percentage of fines, the particle size distribution of the medium viscosity "ASP 600" clay of Example III was determined. Also determined was the particle size distribution of the clay after working with the water and with the 10% urea solution (part B).

It was found that the results were similar when pugging with urea and with water. The results therefore indicate that the remarkable viscosity reduction realized with the urea pugging is not attributable to a change in particle size distribution per se.

EXAMPLE V

This example illustrates the embodiment of our invention wherein the viscosity of a spray-dried artificially delaminated kaolin clay is reduced by mechanically working the clay in a urea solution and washing the clay.

The clay had been obtained by artificially delaminating a coarse size fraction of Georgia kaolin from the McIntyre district of Georgia. The coarse size fraction had an average particle size of about 5 microns. After the clay had been artificially delaminated by agitating a slip of the clay in water with particles of a material that reduced the size of the clay particles, the slip was fractionated. A slip of the fine size fraction was dispersed with tetrasodium pyrophosphate and spray dried. The spray dried clay was composed of particles 100% of which were minus 3.5 microns, 80% minus 2.3 microns and 50% minus 1.3 microns. The resulting clay was an extremely high viscosity clay and cold not be formulated into a slip containing 71% solids. A 62.5% solids slip containing 0.4% tetrasodium pyrophosphate had an apparent Hercules end point viscosity of 17.0 dyne-cm.$\times 10^5$ at 200 r.p.m. Pugging the clay with water in the Read mill for six hours reduced the viscosity of the clay to the extent that a 70.1% solids slip of the pugged clay had an apparent viscosity of 17.0 dyne-cm.$\times 10^5$ at 200 r.p.m.

teristics of a "HV" clay at only 62.6% solids and the urea worked clay had "LV" viscosity characteristics at a similar solids level, it can be seen that the process of the invention was eminently effective in improving the viscosity characteristics of the clay. As a further indication of the improved viscosity of the artificially delaminated clay, it was found that the urea-pugged clay could be prepared as a 71.6% solids slip having "HV" characteristics. As mentioned above, the starting clay could not be prepared as a slip containing even 70% solids.

We claim:

1. A method for reducing the aqueous viscosity of kaolin clay which comprises providing a mixture of said clay with an unsaturated aqueous solution of urea in amount sufficient to form a mass of puggable consistency, pugging said mixture with a high energy input until the high shear viscosity of a dispersed aqueous slip of said clay is reduced, the pugging being carried out without forming a urea-kaolinite intercalation compound, and removing urea from said pugged clay by washing, said urea being present in proportion relative to the quantity of clay such that the washed, pugged clay has lower apparent aqueous high shear viscosity than the same clay would have if it had been pugged in the absence of urea.

2. The method of claim 1 wherein said urea is employed in amount within the range of about ¼ to 15 gm./100 gm. dry clay.

3. The method of claim 1 wherein the concentration of urea in said water in said mixture is within the range of about ¼% to about 20% concentration.

4. The method of claim 1 wherein said clay is pugged in an open pug mill.

5. The method of claim 1 wherein said clay, without being dried, is washed with water after being pugged.

6. The method of claim 1 wherein said clay is a naturally-occurring kaolin which contains stacks of clay platelets.

7. The method of claim 1 wherein said clay has been mechanically delaminated.

8. The method of claim 1 wherein said clay is substantially free from deflocculating agent when pugged with said urea solution.

9. A method for reducing the high shear aqueous viscosity of naturally-occurring kaolin clay which contains stacks of clay platelets which comprises pugging said clay with a high energy input in an aqueous urea solution of about ¼% to about 20% concentration and containing from 1 to 10 gm. urea per 100 gm. dry clay, said pugging being carried out without adding heat to said clay and without a kaolin-urea intercalation compound being formed, and removing said urea from the pugged clay by washing before the pugged clay is permitted to dry.

10. The method of claim 8 wherein the concentration of said aqueous urea solution is within the range of 1% to 10% by weight.

References Cited

UNITED STATES PATENTS

| | | | |
|---|---|---|---|
| 2,535,647 | 12/1950 | Millman et al. | 106—7 |
| 3,274,011 | 9/1966 | Duke | 106—7 |
| 3,301,691 | 1/1967 | Hemstock et al. | 106—7 |
| 3,309,211 | 3/1967 | Weiss et al. | 106—7 |
| 3,326,705 | 6/1967 | Duke | 106—7 |

JAMES E. POER, Primary Examiner

U.S. Cl. X.R.

23—110; 106—72